US010932606B2

(12) United States Patent
Cohen et al.

(10) Patent No.: US 10,932,606 B2
(45) Date of Patent: Mar. 2, 2021

(54) PORTABLE DRIP COFFEE APPARATUS

(71) Applicant: Dripkit Inc., Brooklyn, NY (US)

(72) Inventors: Kara Cohen, New York, NY (US); Ilana Kruger, New York, NY (US); Stuart Harvey Lee, Forest Hills, NY (US); Caroline Kepley, New York, NY (US)

(73) Assignee: Dripkit Inc., Brooklyn, NY (US)

( * ) Notice: Subject to any disclaimer, the term of this patent is extended or adjusted under 35 U.S.C. 154(b) by 215 days.

(21) Appl. No.: 16/045,656

(22) Filed: Jul. 25, 2018

(65) Prior Publication Data

US 2019/0029460 A1  Jan. 31, 2019

Related U.S. Application Data

(60) Provisional application No. 62/537,390, filed on Jul. 26, 2017.

(51) Int. Cl.
*B65D 85/80* (2006.01)
*A47J 31/06* (2006.01)
*B65D 85/804* (2006.01)
*A47J 31/02* (2006.01)
*A47J 31/44* (2006.01)

(52) U.S. Cl.
CPC ........ *A47J 31/0626* (2013.01); *B65D 85/804* (2013.01); *B65D 85/8043* (2013.01); *A47J 31/02* (2013.01); *A47J 31/4403* (2013.01)

(58) Field of Classification Search
CPC .......................... B65D 85/804; B65D 85/8043
USPC ............... 99/323, 322, 304, 306; 426/82, 77
See application file for complete search history.

(56) References Cited

U.S. PATENT DOCUMENTS

| | | | | |
|---|---|---|---|---|
| 3,279,926 | A * | 10/1966 | Aguirre-Batres | ............................ B65D 85/8043 426/82 |
| 4,715,271 | A * | 12/1987 | Kitagawa | ........... B65D 85/8043 210/474 |
| 5,132,124 | A * | 7/1992 | Tamaki | .................. A47G 19/16 210/474 |
| 5,605,710 | A * | 2/1997 | Pridonoff | ................ A47J 31/02 206/0.5 |
| 5,842,408 | A * | 12/1998 | Hatta | ...................... A47J 31/02 99/323 |
| 6,342,258 | B1 * | 1/2002 | Berings | .............. B65D 81/3415 206/5 |
| 7,128,934 | B1 * | 10/2006 | Ohta | .................. B65D 85/8043 426/82 |
| 7,793,585 | B2 * | 9/2010 | Rasmussen | .......... B65D 85/816 99/323 |
| 2010/0116144 | A1 * | 5/2010 | Safai | ...................... A47J 31/06 99/298 |

* cited by examiner

*Primary Examiner* — Reginald Alexander
(74) *Attorney, Agent, or Firm* — Lowenstein Sandler LLP

(57) ABSTRACT

A drip coffee apparatus includes a body of the drip coffee apparatus. The body includes a perforated top and notches at a bottom of the body of the drip coffee apparatus. A protruding handle is coupled with the body of the drip coffee apparatus. Furthermore a protruding tab is at the perforated top of the body of the drip coffee apparatus and a coffee filter is coupled to an interior of the body of the drip coffee apparatus.

9 Claims, 2 Drawing Sheets

PORTABLE DRIP COFFEE APPARATUS

RELATED APPLICATION

This application claims the benefit under 35 U.S.C. § 119(e) of U.S. Provisional Application 62/537,390 filed on Jul. 26, 2017, which is incorporated by reference in its entirety.

TECHNICAL FIELD

Aspects of the present disclosure relate to a coffee apparatus, and more specifically, to a portable drip coffee apparatus.

BACKGROUND

A drip coffee is brewed by pouring water over and through coffee grounds to extract coffee flavors into water which is collected in a serving vessel. Such a brewing technique requires coffee grounds, a filter, and a filter holder. The process of brewing starts with placing the filter inside the filter holder and placing an adequate amount of coffee grounds into the filter. Then, the filter holder is placed over a top of the serving vessel which is toe hold the coffee that is to be brewed. After the filter holder is set up, water is poured over the coffee grounds in the filter. Accordingly, coffee flavors from the coffee grounds are extracted into the water and the water flows through the filter into the serving vessel.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

A drip coffee apparatus is disclosed. In an implementation, the drip coffee apparatus includes a body. The body includes a perforated top and notches at a bottom of the body of the drip coffee apparatus. The drip coffee apparatus further includes a protruding handle coupled with the body of the drip coffee apparatus, a protruding tab at the perforated top of the body of the drip coffee apparatus, and a coffee filter coupled to an interior of the body of the drip coffee apparatus.

In some implementations, the protruding handle is configured to be placed over a portion of a top of an open container.

In some implementations, the drip coffee apparatus is configured to compress or expand the body of the drip coffee apparatus to adjust a width of the body after the perforated top with the protruding tab is removed.

In some implementations, the body of the drip coffee apparatus includes a first side surface, a second side surface, a third side surface, and a fourth side surface. The first side surface and fourth side surface may be coupled with the protruding handle and with the second side surface and third side surface, respectively. Furthermore, the second side surface may be coupled with the third side surface.

In some implementations, at a bottom of the first side surface, second side surface, third side surface and fourth side surface, each respective side surface includes at least one of the notches and each notch is at a location to be placed over a portion of a top of an open container.

In some implementations, the notches of the second side surface and the third side surface are wider than the notches of the first side surface and the fourth side surface.

In some implementations, at a bottom of the first side surface and fourth side surface, each respective side surface has an indented tab at a location to be placed over a portion of a top of an open container.

In some implementations, at a bottom of the second side surface and third side surface, each respective side surface includes a stabilizing tab where the stabilizing tab of the second side surface is coupled to the stabilizing tab of the third side surface. The stabilizing tabs may be configured to hold the drip coffee apparatus at a fixed position over a top of an open container.

In some implementations, the protruding tab may be configured to enclose the perforated top of the body of the drip coffee apparatus and the coffee filter.

In some implementations, the coffee filter is coupled to an interior of the first side surface and fourth side surface of the body of the drip coffee apparatus.

In some implementations, the body of the drip coffee apparatus, the protruding handle, and the protruding tab form one piece.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
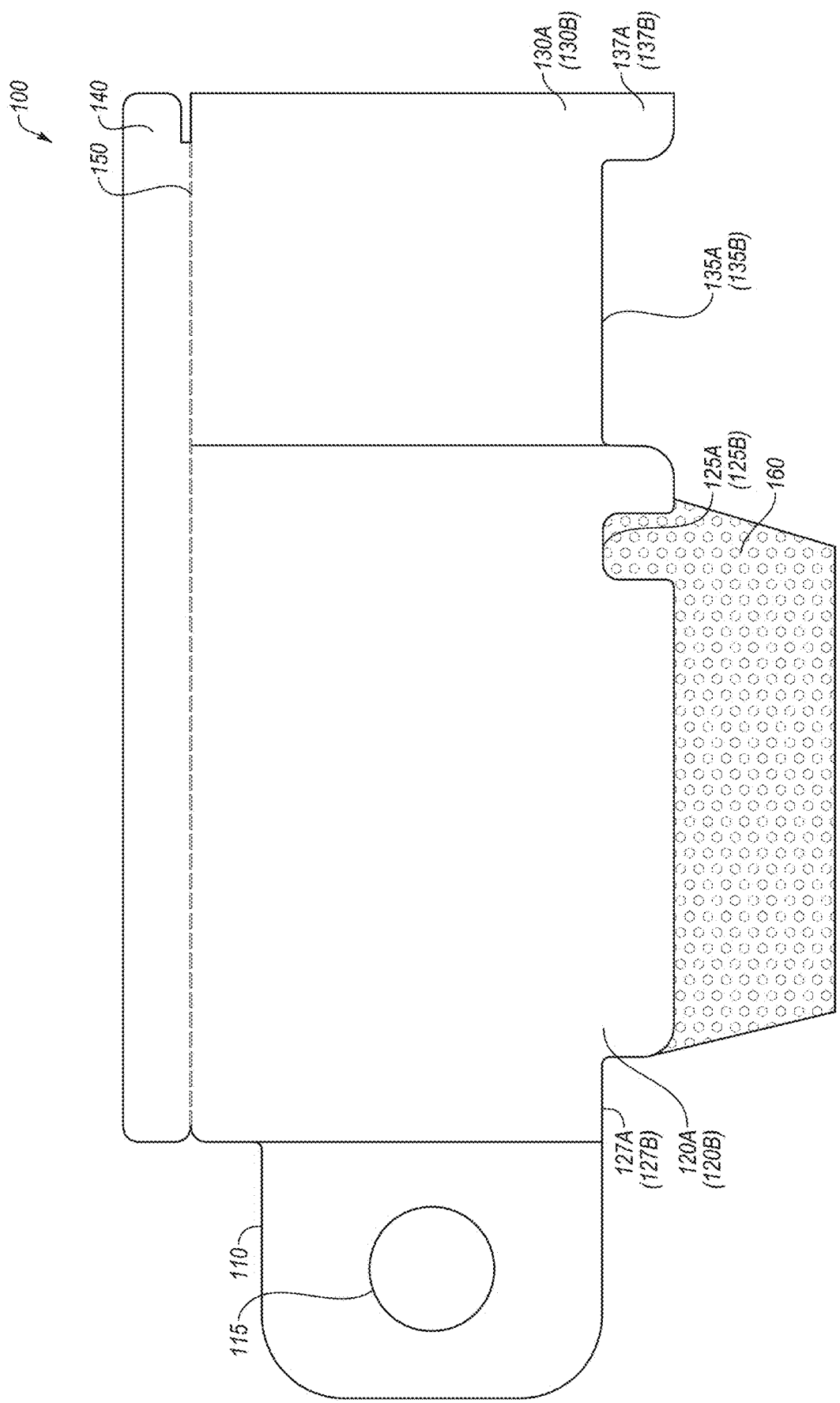
FIG. 1 illustrates a side view of an example of a drip coffee apparatus for implementations of the present disclosure.

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

A drip coffee is brewed by pouring water over and through coffee grounds to extract coffee flavors into a cup or a serving vessel. An example of a drip coffee is a pour over coffee. In general, a coffee grinder, a filter, and a filter holder are used to prepare the brewing of the coffee. For example, the coffee grinder is used to grind coffee beans, or alternatively pre-ground coffee can be stored in a separate container. Subsequently, the filter is placed into the filter holder and the ground coffee beans are then placed into the filter. Finally, hot water is then run through the coffee grounds.

As such, to brew the drip coffee, multiple and separate apparatuses such as a coffee grinder, container to store coffee beans, filter, and a filter holder are needed to brew the coffee. However, the coffee grinders, coffee bean containers, filters, and filter holders may be quite bulky. In addition, the filter holder may be fragile as the filter holder is usually made of ceramics or plastics. Accordingly, it is difficult to brew a drip coffee on a trip or outside of one's home or a coffee shop where the various apparatuses need to be transported.

Aspects and implementations of the present disclosure address the above and other deficiencies by providing a portable drip coffee apparatus. In some implementations, the portable drip coffee apparatus that includes a body structure that is coupled with a coffee filter. The body structure may be configured to be placed over the top of an open container (e.g., a coffee mug or a cup). For example, at first the body structure may be flat and the coffee filter may be sealed with pre-ground coffee. Subsequently, a portion of the body structure may be removed along with a seal of the coffee filter. The body structure may then be extended (i.e., unfolded) to fit the top of the open container and hot water may then be placed through the coffee grounds in the coffee filter.

As such, a single apparatus may be used to prepare the drip coffee as opposed to multiple different apparatuses. Advantages of the present disclosure include, but are not limited to, a less bulky and more convenient apparatus to prepare drip coffee. Additionally, the amount of preparation time to brew the drip coffee may be reduced as a single apparatus may be used to prepare the drip coffee. Furthermore, the cleanup of the drip coffee may be more efficient with the use of the single apparatus as the single apparatus including the coffee filter and ground coffee may be disposed.

FIG. 1 illustrates a side view of an example of a drip coffee apparatus 100 for implementations of the present disclosure.

The drip coffee apparatus 100 includes a body 120A, 120B, 130A, and 130B. The body 120A, 120B, 130A, and 130B includes a perforated top 150 and multiple notches 125A, 125B, 135A, and 135B at a bottom of the body 120A, 120B, 130A, and 130B of the drip coffee apparatus 100. The drip coffee apparatus 100 further includes a protruding handle 110 coupled with the body 120A, 120B, 130A, and 130B and a protruding tab 140 at the perforated top 150 of the body 120A, 120B, 130A, and 130B. Moreover, the drip coffee apparatus 100 includes a coffee filter 160 coupled to an interior of the body 120A, 120B, 130A, and 130B. The coffee filter 160 may include coffee grounds.

The drip coffee apparatus 100 may be made of a cardboard or other such paper-based material or any other material that can be folded. The body 120A, 120B, 130A, and 130B, the protruding handle 110, and the protruding tab 140 may form one piece (e.g., a single piece of the foldable material). Further, the body 120A, 120B, 130A, and 130B may be foldable as shown in FIG. 1. Thus, the folded drip coffee apparatus 100 may be compact and easily transported to later brew a drip coffee.

The protruding handle 110 may be placed over a portion of a top of an open container such as a container 200 (e.g., a cup or a mug) after the protruding tab 140 is removed. The body 120A, 120B, 130A, and 130B may be extended to variable distances to cover containers with different opening sizes. Moreover, a bottom of the protruding handle 110 may be used to rest over the top of the container 200. The protruding handle 110 may further be used by a user of the drip coffee apparatus 100 to lift or remove the drip coffee apparatus 100 from the top of the open container after the coffee has been brewed. In an implementation, the protruding handle 110 may be shorter than the body 120A, 120B, 130A, and 130B so that the protruding handle 110 can be placed over the top of the container 200. In an implementation, the body 120A, 120B, 130A, and 130B of the drip coffee apparatus 100 may be configured to compress or expand to adjust a width of the drip coffee apparatus 100 after the protruding tab 140 has been removed. In another implementation, the protruding handle 110 may have a hole 115 to allow the user to insert a finger to easily hold the drip coffee apparatus 100 over the container 200.

In some implementations, the body 120A, 120B, 130A, and 130B of the drip coffee apparatus 100 may include a first side surface 120A, a second side surface 130A, a third side surface 130B, and a fourth side surface 120B. FIG. 1 depicts the side view of the drip coffee apparatus 100, and thus only illustrates two side surfaces (i.e., the first side surface 120A and the second side surface 130A). However, the fourth side surface 120B and third side surface 130B are folded behind the first side surface 120A and the second side surface 130A, respectively in FIG. 1. The first side surface 120A and fourth side surface 120B are coupled with the protruding handle 110. Moreover, the first side surface 120A and fourth side surface 120B may be coupled with the second side surface 130A and third side surface 130B, respectively. Additionally, the second side surface 130A may be coupled with the third side surface 130B. That is, the first side surface 120A may be coupled with the second side surface 130A, the second side surface 130A may be coupled with the third side surface 130B, and the third side surface 130B may be coupled with the fourth side surface 120B. In an implementation, the first side surface 120A and fourth side surface 120B may be wider than the second side surface 130A and third side surface 130B, or vice versa. In another implementation, all four side surfaces 120A, 120B, 130A, and 130B may be of the same width.

In an implementation, the bottom of each side surface 120A, 120B, 130A, and 130B may include at least one notch 125A, 125B, 135A, and 135B. Each notch 125A, 125B, 135A, and 135B may be at a location to be placed over a portion of a top of an opened container (i.e., the container 200). In some implementations, the notches 135A and 135B of the second side surface 130A and the third side surface 130B may be wider than the notches 125A and 125B of the first side surface 120A and the fourth side surface 120B. In this way, the second side surface 130A and third side surface 130B may facilitate the drip coffee apparatus 100 to be better balanced on the top of the cup 200 and accommodate containers with different opening sizes. In an implementation, at a bottom of the first side surface 120A and fourth side surface 120B, there may be an indented tab 127A and 127B at a location to be placed over a portion of a top of the container 200. The indented tabs 127A and 127B may be at the same level as the bottom of the protruding handle 110 so that both the indented tabs 127A and 127B and the protruding handle 110 may support the drip coffee apparatus 100 to stay on the top of the container 200.

In addition to the notches 125A, 125B, 135A, and 135B and indented tabs 127A and 127B, at a bottom of the second side surface 130A and third side surface 130B, each respective side surface may include a stabilizing tab 137A and 137B. The stabilizing tab 137A of the second side surface 130A may be coupled with the stabilizing tab 137B of the third side surface 130B. Further, the stabilizing tabs 137A and 137B are configured to hold the drip coffee apparatus 100 at a fixed position over a top of container cup 200. In another implementation, the stabilizing tabs 137A and 137B may be configured to be placed inside the container 200 so that the apparatus 100 does not fall out of the cup 200 while the hot water is poured in.

The protruding tab 140 may be configured to enclose the perforated top 150 of the body 120A, 120B, 130A, and 130B of the drip coffee apparatus 100 and the coffee filter 160. The protruding tab 140 may be removed along the perforated top 150. Visual indicators (e.g., arrows) may be placed on the perforated top 150 and/or the protruding tab 140 to indicate a direction to apply force to remove the protruding tab 140. As the protruding tab 140 is removed, a top portion (e.g., a flap) of the coffee filter 160 may also be removed exposing content (e.g., coffee grounds or other such material) inside the coffee filter 160. Once the protruding tab 140 is removed, the user may pull or push the body 120A, 120B, 130A, and 130B to adjust the width of the drip coffee apparatus 100 so that the drip coffee apparatus 100 is securely placed over the top of the container 200. Accordingly, the four side surfaces 120A, 120B, 130A, 130B may form a quadrangle once the drip coffee apparatus 100 is placed over a top of the container 200 as will be described in detail with respect to FIG. 2 below. Otherwise, the width of the body 120A, 120B, 130A, and 130B may not be adjusted if the protruding tab 140 is not removed from the perforated top 150.

In some implementations, the coffee filter 160 may be coupled to an interior of the first side surface 120A and fourth side surface 120B of the body 120A, 120B, 130A, and 130B of the drip coffee apparatus 100. The coffee filter 160 may include a top flap on each side of the coffee filter 160 being coupled to the interior of the body 120A, 120B, 130A, and 130B to seal contents (e.g., coffee grounds) inside the sealed coffee filter 160 until the protruding tab 140 is removed. The top flaps of the coffee filter 160 may be coupled to the protruding tab 140. Accordingly, as the protruding tab 140 is removed to allow the adjusting of the width of the body 120A, 120B, 130A, and 130B, the top flaps of the coffee filter 160 may also be removed thereby exposing the contents inside the filter 160. In other implementations, the coffee filter 160 may be coupled to interior of all four sides of the body 120A, 120B, 130A, and 130B. The coffee filter 160 may be adhesively coupled and heat-sealed to the interior of the body 120A, 120B, 130A, and 130B. In addition, a shape of the coffee filter 160 may be formed in a way to direct a water flow towards the bottom of the coffee filter 160. The bottom of the coffee filter 160 may be gusseted to allow multiple exits and an even water flow through the stored coffee grounds. In an implementation, the coffee filter 160 may be made of a paper-based material. In some embodiments, the coffee filter 160 may be made of a poly-based material.

Figure 2:
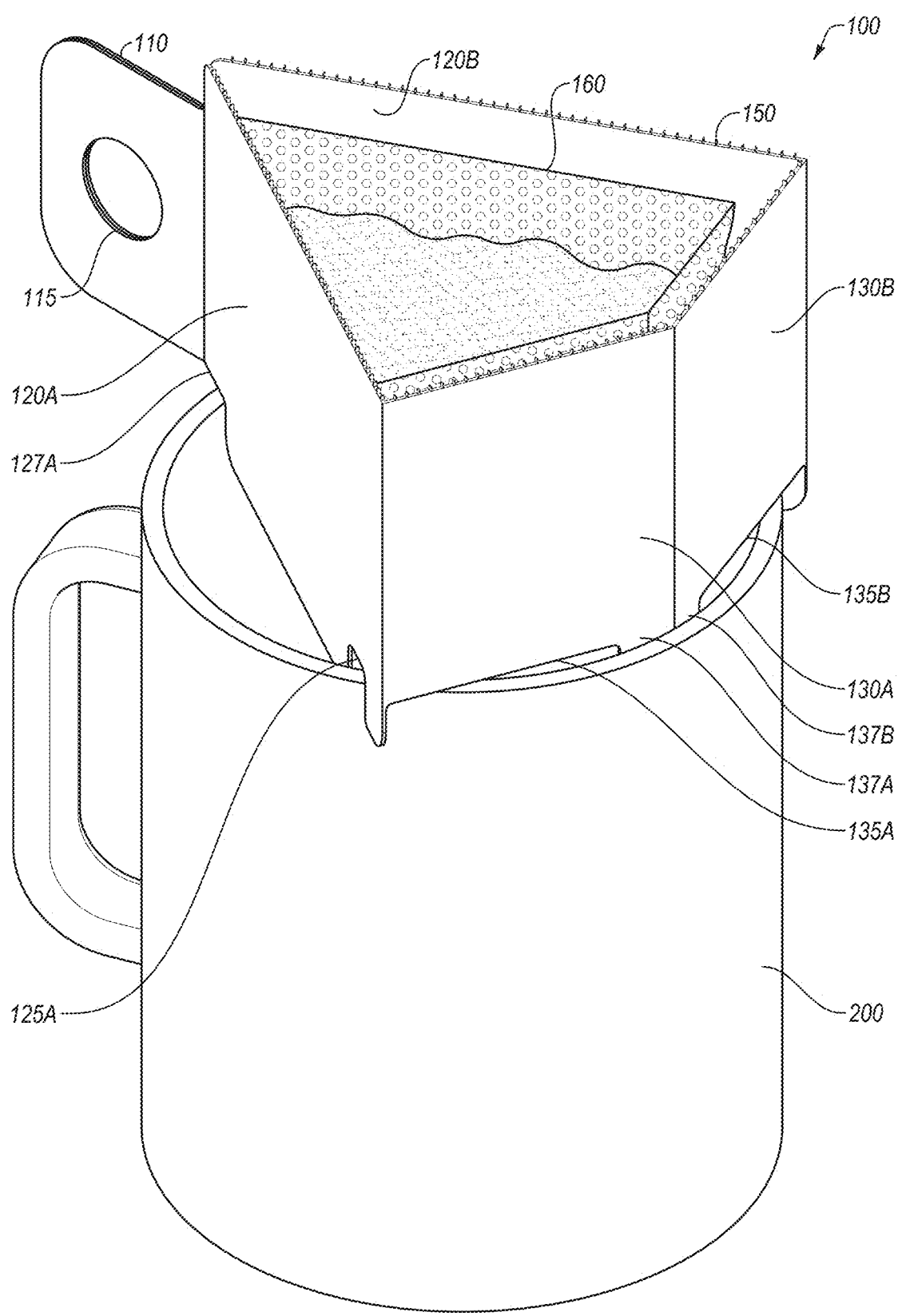
FIG. 2 illustrates an example of the drip coffee apparatus with the protruding tab removed and placed on a top of an open container for use in accordance with implementations of the present disclosure.

FIG. 2 illustrates an example of the drip coffee apparatus 100 with the protruding tab 140 removed and placed on a top of the container 200 for use, in accordance with implementations of the present disclosure.

The drip coffee apparatus 100, as illustrated in FIG. 1, may first be included in a package and removed from the package. The user may remove the protruding tab 140 to expose content, such as coffee grounds, in the coffee filter 160. Then, the user may place the drip coffee apparatus 100 over a top of the container 200 as depicted in FIG. 2 using the protruding handle 110. The user may pour hot water into the coffee filter 160 to brew a drip coffee that is deposited into the container 200 upon which the drip coffee apparatus 100 is placed upon.

As depicted in FIG. 2, the four side surfaces 120A, 120B, 130A, and 130B are coupled in a foldable manner to form a quadrangle ensuring that the coffee filter 160 can hold a sufficient amount of hot water. In addition, each of the four side surfaces 120A, 120B, 130A, and 130B includes at least one supporting element such as a notch 125A, 125B, 135A, or 135B, an indented tab 127A or 127B, or a stabilizing tab 137A or 137B to hold the drip coffee apparatus 100 on the top of the container 200. However, the stabilizing tabs 137A and 137B may or may not be placed over the top of the container 200 depending on an opening size of the container 200.

Although FIGS. 1 and 2 illustrate the drip coffee apparatus 100 with notches at the bottom of the drip coffee apparatus 100, in some embodiments, other such supporting elements may be located at the bottom of the drip coffee apparatus 100. For example, instead of the notches at the bottom of the drip coffee apparatus 100, platforms may be located at the bottom of the drip coffee apparatus 100. In some embodiments, the platforms may be elongated poles or sticks (or other such supporting elements) that are coupled to the bottom of the drop coffee apparatus 100 and that are to be placed over the top of an open container.

Although aspects of the present disclosure describe a drip coffee apparatus, any other type of drip beverage may be utilized with the present disclosure. For example, the coffee filter 160 may include different contents different from coffee grounds (e.g., tea) that may be brewed via a similar process.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A drip coffee apparatus comprising:
a body formed by a first side surface, a second side surface, a third side surface and a fourth side surface, the body comprising a perforated top and a bottom with a plurality of notches;
a protruding handle coupled with the body;
a protruding tab at the perforated top of the body; and
a coffee filter coupled to an interior of the body;
wherein the first side surface and forth side surface are coupled with the protruding handle and with the second side surface and third side surface, respectively;
wherein the second side surface is coupled with the third side surface; and
wherein at a bottom of the second side surface and third side surface, each respective side surface includes a stabilizing tab, the stabilizing tab of the second side surface coupled to the stabilizing tab of the third side surface, and the stabilizing tabs configured to hold the drip coffee apparatus at a fixed position over a top of an open container.

2. The drip coffee apparatus of claim 1, wherein the protruding handle is configured to be placed over a portion of a top of an open container.

3. The drip coffee apparatus of claim 1, wherein the body of the drip coffee apparatus is configured to be compressed or expanded after the protruding tab at the perforated top of the body is removed.

4. The drip coffee apparatus of claim 1, wherein at a bottom of the first side surface, second side surface, third side surface and fourth side surface, each respective side surface includes at least one of the plurality of notches and each notch of the plurality of notches is at a location to be placed over a portion of a top of an open container.

5. The drip coffee apparatus of claim 4, wherein the notches of the second side surface and the third side surface are wider than the notches of the first side surface and the fourth side surface.

6. The drip coffee apparatus of claim 1, wherein at a bottom of the first side surface and fourth side surface, each respective side surface has an indented tab at a location to be placed over a portion of a top of an open container.

7. The drip coffee apparatus of claim 1, wherein the protruding tab is configured to enclose the perforated top of the body of the drip coffee apparatus and the coffee filter.

8. The drip coffee apparatus of claim 1, wherein the coffee filter is coupled to an interior of the first side surface and fourth side surface of the body of the drip coffee apparatus.

9. The drip coffee apparatus of claim 1, wherein the body of the drip coffee apparatus, the protruding handle, and the protruding tab are forming one piece.

\* \* \* \* \*